United States Patent
Merrikh et al.

(10) Patent No.: US 10,309,838 B2
(45) Date of Patent: Jun. 4, 2019

(54) TEMPORAL TEMPERATURE SENSOR POSITION OFFSET ERROR CORRECTION

(71) Applicant: QUALCOMM Incorporated, San Diego, CA (US)

(72) Inventors: Ali Akbar Merrikh, Austin, TX (US); Martin Saint-Laurent, Austin, TX (US); Mohammad Ghasemazar, Long Beach, CA (US); Rajit Chandra, Cupertino, CA (US); Mohamed Allam, Rancho Santa Fe, CA (US)

(73) Assignee: QUALCOMM Incorporated, San Diego, CA (US)

( * ) Notice: Subject to any disclaimer, the term of this patent is extended or adjusted under 35 U.S.C. 154(b) by 269 days.

(21) Appl. No.: 15/260,194

(22) Filed: Sep. 8, 2016

(65) Prior Publication Data
US 2018/0066998 A1 Mar. 8, 2018

(51) Int. Cl.
| | |
|---|---|
| *G01K 1/20* | (2006.01) |
| *G01K 1/14* | (2006.01) |
| *G01K 7/01* | (2006.01) |
| *G01K 7/42* | (2006.01) |
| *G06F 1/20* | (2006.01) |
| *G01K 15/00* | (2006.01) |

(52) U.S. Cl.
CPC ............ *G01K 1/20* (2013.01); *G01K 1/14* (2013.01); *G01K 7/01* (2013.01); *G01K 7/427* (2013.01); *G01K 15/005* (2013.01); *G06F 1/206* (2013.01); *Y02D 10/16* (2018.01)

(58) Field of Classification Search
CPC .. G01K 1/14; G01K 1/20; G01K 7/01; G01K 7/427; G01K 15/005; G06F 1/206
See application file for complete search history.

(56) References Cited

U.S. PATENT DOCUMENTS

| | | | |
|---|---|---|---|
| 7,149,645 B2 | 12/2006 | Mangrulkar et al. | |
| 7,877,222 B2 | 1/2011 | Boerstler et al. | |
| 8,607,023 B1 | 12/2013 | Kraipak et al. | |
| 2006/0238267 A1 | 10/2006 | Bienek et al. | |
| 2008/0155281 A1* | 6/2008 | Savransky | G06F 1/206 713/300 |
| 2011/0131004 A1* | 6/2011 | Cloetens | G01K 7/42 702/132 |
| 2013/0169347 A1 | 7/2013 | Kim et al. | |
| 2015/0103866 A1* | 4/2015 | Samadi | G01K 7/427 374/170 |

(Continued)

OTHER PUBLICATIONS

International Search Report and Written Opinion—PCT/US2017/046967—ISA/EPO—dated Oct. 19, 2017.

*Primary Examiner* — Randy W Gibson
(74) *Attorney, Agent, or Firm* — Seyfarth Shaw LLP

(57) ABSTRACT

A temperature sensor position offset error correction power implementation include monitors (e.g., digital power monitor/meter) to measure activity on a die, and uses the activity measurements to compute real-time temperature offsets by converting activity to power, which can be used in a simplified compact thermal model. A system on chip including the die receives a temperature measurement of a region of the system on chip from a sensor. Power consumed by the region is estimated based on the measured activity, and temperature measurement of the system on chip is adjusted based on the estimated power.

18 Claims, 9 Drawing Sheets

(56) References Cited

U.S. PATENT DOCUMENTS

| | | | |
|---|---|---|---|
| 2015/0106642 A1 | 4/2015 | Naffziger et al. | |
| 2015/0227391 A1 | 8/2015 | Paul et al. | |
| 2015/0292959 A1 | 10/2015 | Graf et al. | |
| 2015/0346798 A1* | 12/2015 | Dongara | G06F 1/3206 713/320 |
| 2017/0099204 A1* | 4/2017 | Park | H04L 43/0888 |
| 2018/0004260 A1* | 1/2018 | Amin-Shahidi | G06F 1/206 |
| 2018/0321718 A1* | 11/2018 | Kaundinya | G06F 1/206 |

* cited by examiner

TEMPORAL TEMPERATURE SENSOR POSITION OFFSET ERROR CORRECTION

TECHNICAL FIELD

This application relates to thermal mitigation and, more specifically, to temporal temperature sensor position offset error correction by using on-die power monitors.

BACKGROUND

A conventional modern smart phone may include a system on chip (SoC), which has a processor and other operational circuits. Specifically, an SoC in a smart phone may include a processor chip within a package, where the package is mounted on a printed circuit board (PCB) internally to the phone. The phone includes an external housing and a display, such as a liquid crystal display (LCD). A human user when using the phone physically touches the external housing and the display.

As the SoC operates, it generates heat. In one example, the SoC within a smart phone may reach temperatures of 80° C.-100° C. Furthermore, conventional smart phones do not include fans to dissipate heat. During use, such as when a human user is watching a video on a smart phone, the SoC generates heat, and the heat is spread through the internal portions of the phone to the outside surface of the phone.

The outside surface of the phone is sometimes referred to as the "skin." The outside surface includes the part of the external housing that is physically on the outside of the phone as well as any other externally-exposed portions, such as an LCD display. It is generally accepted that the skin of the phone should not reach temperatures higher than about 40° C.-45° C. due to safety and ergonomic reasons. As noted above, the SoC within the smart phone may reach temperatures of 80° C.-100° C., although the temperature of the SoC is not felt directly at the skin of the phone. Instead, heat dissipation within the phone often means that the skin temperature of the phone is at a lower temperature than the SoC temperature. Furthermore, whereas changes to SoC temperature may be relatively quick (e.g., seconds), changes to device skin temperature may be relatively slow (e.g., tens of seconds or minutes).

Conventional smart phones include algorithms to control the skin temperature by reducing a frequency of operation of the SoC when a temperature sensor in the SoC reaches a threshold level. However, SoC temperature is difficult to accurately measure.

SUMMARY

In one aspect of the present disclosure, a method of correcting thermal sensor measurements on a die is disclosed. The method includes receiving a temperature measurement of a region from a sensor. The also includes estimating power consumed by the region. The method further includes adjusting the temperature measurement based on the estimated power.

Another aspect discloses an apparatus for correcting thermal sensor measurements on a die. The apparatus has a memory and at least one processor coupled to the memory. The processor(s) is configured to receive a temperature measurement of a region from a sensor. The processor(s) is also configured to estimate power consumed by the region. The processor is further configured to adjust the temperature measurement based on the estimated power.

In another aspect, non-transitory computer-readable medium having non-transitory program code recorded thereon is disclosed. The non-transitory program code which, when executed by the processor(s), causes the processor(s) to perform operations of receiving a temperature measurement of a region from a sensor. The program code also causes the processor(s) to estimate power consumed by the region. The program code further causes the processor(s) to adjust the temperature measurement based on the estimated power.

Another aspect discloses an apparatus including means for receiving a temperature measurement of a region from a sensor. The apparatus also includes means for estimating power consumed by the region. The apparatus further includes means for adjusting the temperature measurement based on the estimated power.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

DETAILED DESCRIPTION

Figure 1:
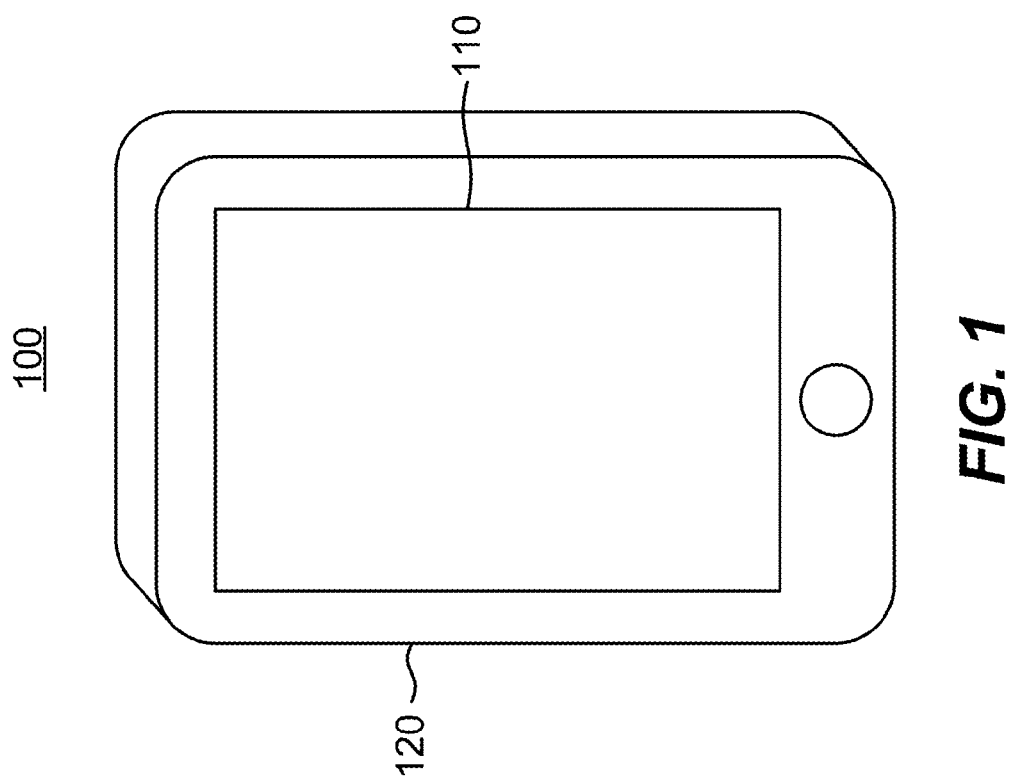
FIG. 1 is an illustration of an example computing device that may perform a method according to various aspects.

Conventionally temperature sensors sense temperatures of SoCs. For example, temperature sensors detect hot-spots induced due to large power density expected in today's SoCs. Exemplary temperature sensors include p-channel metal oxide semiconductor (PNP or PMOS) diodes or transistors (e.g., thermal) or n-channel metal oxide semiconductor (NPN or NMOS) diodes or transistors (e.g., thermal). However, the sensors cannot be placed exactly where the hot-spots occur. For example, the sensors are placed in sub-optimal areas of an active layer of a semiconductor device (e.g., made of silicon), which results in position offset inaccuracies and insufficient spatial coverage of the sensors, leading to placement errors. These conventional temperature sensing implementations result in inaccurate temperature measurements. Such errors and inaccuracies generate risks to device operation, performance, and device reliability.

Some reasons for positioning constraint of temperature sensors include silicon design constraints due to routing complexity impacting device performance. For example, placing sensors in certain regions of the cores of a central processing unit (CPU) impacts the CPU performance due to routing specifications. Also, placing sensors over bump regions can negatively impact sensor operation. Other reasons for sensor errors are due to limitations on a number of installed sensors.

Further reasons for positioning constraint of temperature sensors stem from applications and use cases that exercise different regions of the silicon, resulting in shifting or moving hot-spots, which cannot be characterized using static methods. For example, use case dependence of power density profiles of the system results in shifting or moving of hot-spots. Placing sensors over any potential hot-spot is challenging or impossible.

Aspects of the present disclosure are directed to power monitors (e.g., digital power monitor/meter) to measure activity, and using the activity measurements to compute real-time temperature offsets by converting activity to power, which can be used in a simplified compact thermal model. The compact thermal model may be a pre-silicon thermal model that defines parameters stored in the computing device and used for correcting temperature measurements from sensors. For example, the power monitors measure activity of active regions of the SoC that remain undetected by the temperature sensors. Thus, the proposed framework converts activity to power, and computes temperature offsets in accordance with a simplified compact thermal model using real-time power information fed into the framework.

A process of correcting thermal sensor measurements on a device (e.g., die or SoC) is described. The die may be implanted within the SoC. The process described may be implemented as computer executable code that is read and executed by a kernel process of the processor. In another aspect, the process may be implemented as a hardware process built in to the processor.

Aspects of the present disclosure may be performed by a software kernel of the SoC that is tasked with thermal mitigation. The SoC is in electrical communication with the temperature sensor and continually measures temperature using the temperature sensor. For example, if the temperature sensor is a thermistor, the SoC may apply a voltage across the thermistor and measure resistance changes by translating electrical current or voltage measurements into digital signals that can be read by the thermal mitigation process of the software kernel.

In one aspect of the disclosure, the SoC receives a temperature measurement of a region of the SoC from the sensor, estimates power consumed by the region and adjusts the temperature measurement based on the estimated power. The estimated power consumed by the region represents a temperature difference or an absolute temperature. The power consumed by the region may be estimated based on a numerical or analytical formulation. In one aspect of the disclosure, the power consumed by the region of the SoC may be based on an activity of the region. For example, the activity of the region may be measured by power monitors (e.g., digital power monitor/meter), converted to power, and temperature offsets are then derived in accordance with a simplified compact thermal model using real-time power information fed into the framework.

In some aspects of the disclosure, the activity includes current flowing through a power switch or performance of a device based on the die. The performance measurements corresponding to the performance of the device are determined based on performance counters. For example, the performance counters determine a number of cache misses, or a number of pipeline stalls as measurements.

FIG. 1 is a simplified diagram illustrating an example computing device 100 in which various aspects may be implemented. In the example of FIG. 1, computing device 100 is shown as a smart phone. However, the scope of aspects is not limited to a smart phone, as other aspects may include a tablet computer, a laptop computer, or other appropriate device. In fact, the scope of aspects includes any particular computing device, whether mobile or not. Aspects including battery-powered devices, such as tablet computers and smart phones, may benefit from the concepts disclosed herein. Specifically, the concepts described provide techniques to estimate heat inside computing device 100.

As shown in FIG. 1, computing device 100 includes an outer surface or skin 120, which may be expected to come into contact with hands or other parts of the body of a human user. The outside surface 120 includes, e.g., metal and plastic surfaces and the surfaces that make up display unit 110. In one example, display unit 110 is a capacitive liquid crystal display (LCD) touchscreen, so that the surface of display unit 110 is either glass or plastic-coated glass. The outside surface 120 therefore includes the various external surfaces such as the display unit 110 and the other parts of the external housing. Although not shown in the vantage point of FIG. 1, the back side of computing device 100 includes another part of the outer surface of the device, and specifically another part of the exterior housing, which may be arranged in a plane parallel to a plane of display unit 110.

FIG. 1 does not show a computer processor, but it is understood that a computer processor is included within computing device 100. In one example, the computer processor is implemented in a SoC within a package, and the package is mounted to a printed circuit board and disposed within the physical housing. In conventional smart phones, the package including the processor is mounted in a plane parallel to a plane of the display surface and a plane of the back surface.

As a computer processor operates, it produces heat, which dissipates throughout the physical structure of computing device 100. Depending on the specific thermal properties of computing device 100, heat from the operation of the processor may reach uncomfortable or near-uncomfortable temperatures on the outside surface 120 of computing device 100. The computer processor within computing device 100 provides functionality to control the heat felt on the outside surface of the computing device 100 by measuring temperature readings at one or more temperature sensors and adjusting the readings, if appropriate.

Figure 2:
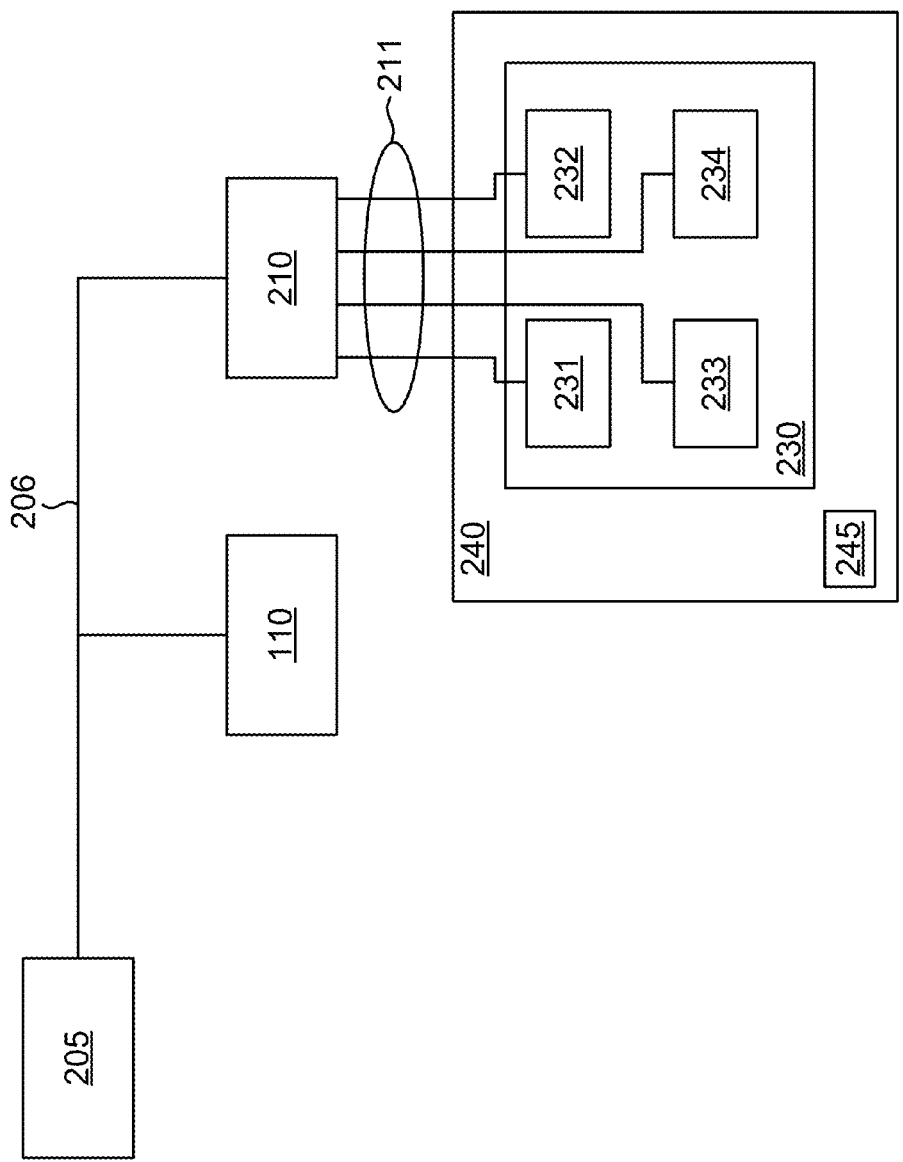
FIG. 2 is an illustration of the internal functional units of the computing device of FIG. 1, according to one aspect.

FIG. 2 is an architectural diagram of an example physical layout of the internal functional components of computing device 100 of FIG. 1, according to one aspect. FIG. 2 is intended to be illustrative, and it omits some features for ease of illustration.

Battery 205, power management integrated circuit (PMIC) 210, and SoC 230 are disposed within the computing device 100 so that they are enclosed within the physical housing of the computing device 100 as indicated by exterior surface 120 (as shown in FIG. 1). Furthermore, SoC 230 is included within package 240. Battery 205, power management integrated circuit PMIC 210, and SoC 230 are also in thermal contact with the physical housing so that the heat generated by those items is conducted to the exterior surface 120 of the device 100. Heat generated by SoC 230 is conducted to the exterior surface 120 of the device 100 through package 240. Package 240 further includes thermal sensor 245.

Computing device 100 includes battery 205, which may be any appropriate battery now known or later developed. For instance, battery 205 may include a lithium-ion battery or other power source. Battery 205 is coupled to battery rail 206, which distributes power from the battery 205. Battery rail 206 is coupled to device display 110 and to PMIC 210. In some aspects, the power from battery rail 206 may be regulated or otherwise conditioned before being provided to display 110, however for ease of illustration, battery rail 206 in this example is provided directly to display 110.

PMIC 210 receives power from battery rail 206 and regulates the voltage to provide an output voltage that is usable by SoC 230. SoC 230 has four cores, 231-234. Examples of cores include a central processing unit (CPU), a graphics processing unit (GPU), a modem, and the like. Although not shown in FIG. 2, a clocking circuit provides a clock signal with an operating frequency to each of the cores 231-234, where the clocking circuit may be controlled to increase or decrease the operating frequency.

PMIC 210 provides power to SoC 230, and specifically provides power to the cores 231-234 by four separate power rails 211 in this aspect. The scope of aspects is not limited to any particular SoC architecture, as any appropriate number of cores and PMIC power rails may be used in a particular aspect. For instance, other aspects may include 16 cores, 32 cores, or other number.

SoC 230 includes functionality to measure temperature using temperature sensor 245 and to correct the temperature based on power consumption.

Figure 3:
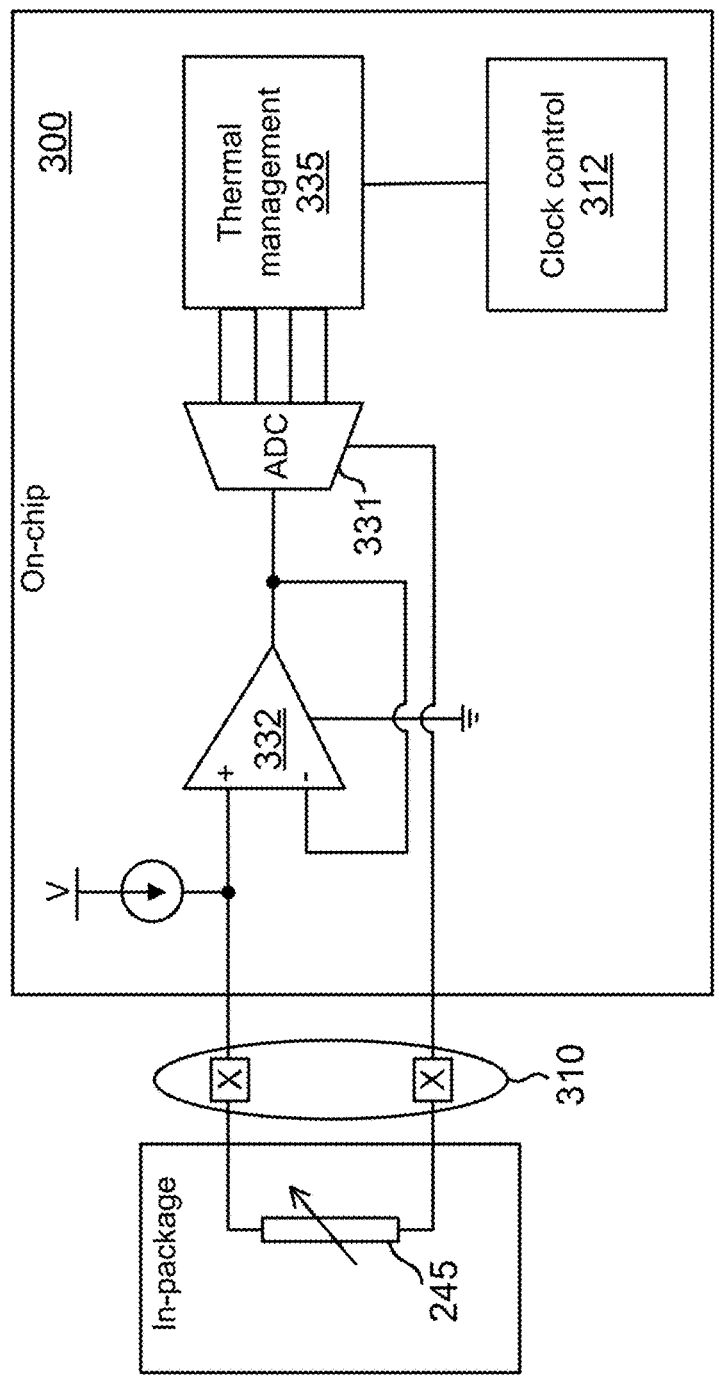
FIG. 3 is an illustration of thermal management circuitry and logic, according to one aspect.

FIG. 3 provides an illustration of an example system that performs the described methods. The system of FIG. 3 includes temperature sensor 245, which in this aspect is shown as a thermistor. A thermistor changes its resistance according to temperature, and the relationship between temperature and resistance is usually non-linear. However, a given thermistor has a known temperature-resistance relationship. Temperature sensor 245 is shown in this aspect in an area labeled "in-package."

Temperature sensor 245 is in electrical communication with on-chip circuitry 300 through use of conductive contacts 310. On-chip circuitry 300 in this example includes circuits and logic that are implemented within SoC 230 (FIG. 2). The on-chip circuitry 300 includes operational amplifier 332, which has a non-inverting input (+) and an inverting input (−). The non-inverting input is in communication with temperature sensor 245. Operational amplifier 332 includes negative feedback, so that the output terminal is coupled to the inverting input. This arrangement smooths out the voltage reading. Voltage at the non-inverting input is indicative of a temperature experienced by temperature sensor 245. Therefore, the output terminal of operational amplifier 332 provides an analog signal that is indicative of the temperature experienced by sensor 245.

The analog output signal from operational amplifier 332 is received by analog to digital converter (ADC) 331, and ADC 331 produces a digital signal indicative of the temperature information received from operational amplifier 332. ADC 331 passes the digital signal to thermal management unit/circuit 335 for further processing. Thermal management unit 335 in one example includes hardware logic to provide thermal management services to SoC 230.

In another aspect, thermal management unit 335 represents thermal management processes that are provided by a software kernel of the SoC 230. For instance, SoC 230 may include a software kernel, which operates when SoC 230 is powered up and receiving a clock signal. Thermal management unit 335 may in that instance include a software process that is built into the kernel. However, either hardware or software or a combination thereof may perform the processes described herein to provide thermal management.

Thermal management unit 335 receives the digital signal from ADC 331, and the digital signal includes data indicative of a temperature measured by sensor 245. Thermal management unit 335 includes at least one programmed temperature threshold that corresponds to a package temperature associated with an undesirable rise in skin temperature. Thermal management unit 335 receives the digital signal from ADC 331 and compares temperature information of that digital signal to the programmed temperature threshold. If the temperature is below the temperature threshold, then thermal management unit 335 may simply continue monitoring on a periodic basis or at other appropriate times. However, thermal management unit 335 may reduce an operating parameter of SoC 230 in response to determining that the temperature indicated by the digital signal has exceeded the threshold. Examples of reducing an operating parameter include reducing a voltage and/or a frequency of operation of SoC 230. The example of FIG. 3 assumes that the process includes at least reducing an operating frequency of SoC 230.

Thermal management unit 335 may reduce the clock frequencies provided to the cores or increase the clock frequencies provided to the cores by sending commands to clock control unit 312. Clock control unit 312 may be physically a part of SoC 230 or separate therefrom, as the scope of aspects is not limited to any particular clocking architecture. Clock control unit 312 may control for instance a phase locked loop (PLL) or other appropriate circuit that provides a periodic clock signal in order to raise or lower the operating frequency of one or more of the cores 231-234.

In one example, when thermal management unit 335 compares the temperature to the temperature threshold, then determines that it is appropriate to lower a frequency of operation, thermal management unit 335 sends a control signal to clock control unit 312 instructing clock control unit 312 to reduce the frequency of operation. Furthermore, thermal management unit 335 may continue to monitor the temperature data from the digital signal and compare it to either the same or a different threshold, and when the temperature drops below either the same or a different threshold, thermal management unit 335 may increase the frequency of operation by sending another control signal to clock control unit 312.

The temperature threshold (or thresholds) that are used by thermal management unit 335 may depend upon the particular thermal conductive properties of a given device. A given device, such as computing device 100 of FIG. 1, is made of various physical materials that cause the device to have particular thermal conductive properties. For instance, some computing devices may include a specially designed heat spreader that is internal to the housing and placed between an inside surface of the housing and the computer processor within the device. A well-functioning heat spreader may keep the heat that is generated by the SoC from being concentrated at one area of the housing, thereby maintaining a more uniform heat profile around the surface of the computing device. Since the heat is spread to more surface area, the heat may be removed by ambient air more efficiently, thereby allowing more heat generation by the SoC before thermal mitigation becomes appropriate.

Figure 4:
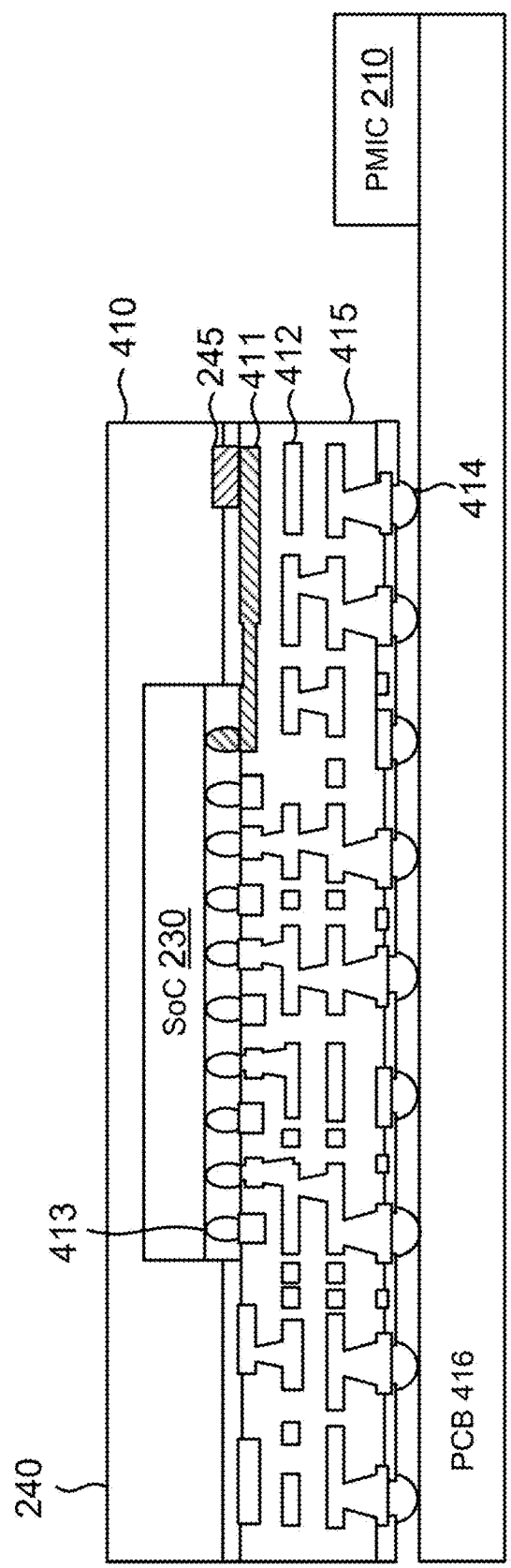
FIG. 4 is an illustration of an example package and printed circuit board architecture including an in-package temperature sensor, adapted according to one aspect.

FIG. 4 is an example of a system employing in-package temperature sensors, according to various aspects. A given package and PCB architecture shown in FIG. 4 may be disposed within the device 100 (FIG. 1) so that it is enclosed at least partly by the outer housing. The long dimension (in this example horizontal) may correspond to the height dimension of device 100 of FIG. 1, so that PCB 416 may be placed parallel to display 110 and to the back surface of the device 100.

Figure 5:
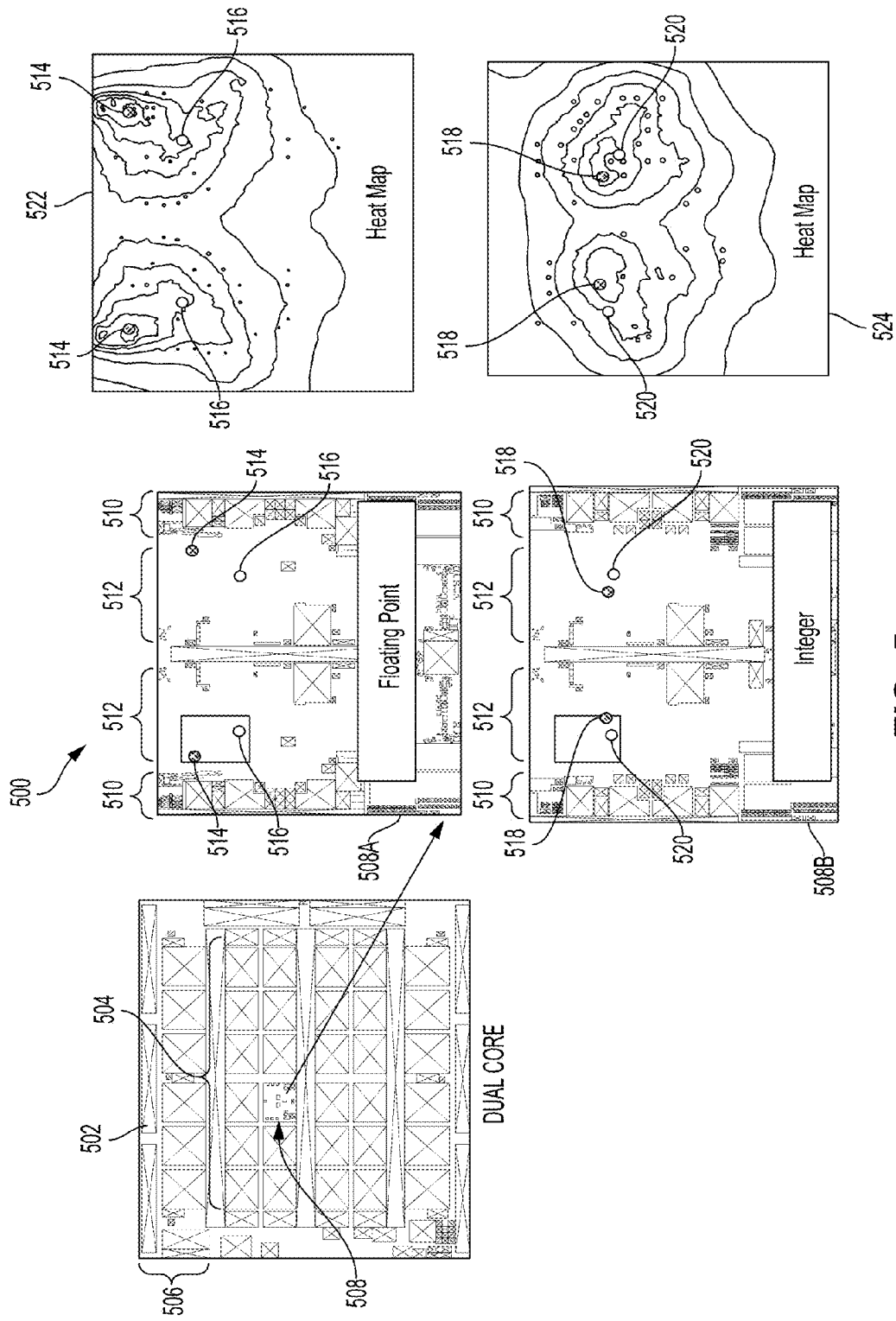
FIG. 5 is an example thermal analysis illustrating application based hot-spot switching according to aspects of the present disclosure.

In FIG. 4, the system includes SoC 230 disposed within package 240. Electrical connection is made between SoC 230 and the rest of package 240 by use of conductive bumps 413. Package 240 is disposed upon printed circuit board (PCB) 416 (as shown in FIG. 5), and electrical connection is made between package 240 and PCB 416 through use of solder balls 414. Power management integrated circuit PMIC 210 provides power to SoC 230 by metal traces (not shown) of PCB 416, one or more solder balls 414, one or more metal layers 412, and one or more conductive bumps 413.

Package 240 includes multiple layers in this example. The topmost layer is a black plastic molding 410, which operates to shield SoC 230 from the environment and to mechanically secure SoC 230 to package 240. The substrate portion of package 240 includes alternating layers of dielectric material 415 and metal layers 412 connected by vias. The example of FIG. 4 is simplified for ease of illustration, and it is understood that a given package may include more and different layers, such as various adhesives and masks. The scope of aspects is not limited to any particular package architecture or materials.

Further in the example of FIG. 4, temperature sensor 245 is disposed within the package such that it is on top of the substrate portion and below plastic molding 410. Temperature sensor 245 is in electrical communication with SoC 230 by use of conductive path 411, which includes metal from one or more of the metal layers of the substrate. In the example of FIG. 4, temperature sensor 245 is physically separate from SoC 230, and it is in indirect thermal contact with SoC 230. Heat produced by SoC 230 is conducted through the materials of package 240 and sensed by temperature sensor 245.

FIG. 5 is an example diagram 500 for thermal analysis illustrating application based hot-spot switching according to aspects of the present disclosure. The diagram shows a significant impact of hot-spot shifting with different application/use cases. The diagram 500 shows temperature distribution of SoC 502, which includes a processor with multiple cores (e.g., dual core) at a central region of the SoC 502. When applications are running on SoC 502, SoC 502 is subject to heat. For example, the cores of the processor are in region 504 (usually around the center) of SoC 502 and are typically the hottest part of the SoC. Peripheral devices 506 and cache devices (e.g., L2 cache) (usually along the sides of the SoC) are usually cooler than the cores.

A core 508 of the multiple cores of the processor is used to perform thermal analysis when different applications are running on the processor. Core 508 is expanded and modeled in detail, and represented as application-specific representations 508A and 508B. The application-specific representation 508A of the core 508 illustrates the core 508 when a first application is running on the processor. The application-specific representation 508B of the core 508 illustrates the core 508 when a second application is running on the processor.

The core 508 and corresponding application-specific representations 508A and 508B include core peripherals (e.g., L1 cache) in regions 510 and core internal regions 512 (e.g., floating point and integer compute units). In some implementations, the first application is directed to a floating point implementation and the second application is directed to an integer implementation. The application-specific representation 508A shows hot-spots 514 and positions of temperature sensors 516. As shown in the application specific representation 508A, the position of the hot-spot and temperature sensors 516 do not coincide, which may result in inaccuracies in the temperature measurements. A further illustration of hot-spots 514 relative to the position of sensor 516 in core 508 when the first application is running in core 508 is shown in thermal map 522.

The application-specific representation 508B shows hot-spots 518 and positions of temperature sensors 520. As shown in the application-specific representation 508B, the position of the hot-spot 518 and the temperature sensors 520 do not coincide, which may result in inaccuracies in the temperature measurements. A further illustration of hot-spots 518 relative to the position of sensor 520 in the core 508 when the first application is running in core 508 is shown in thermal map 524.

The positions of hot-spot 518 and temperature sensor 520 illustrated in the application-specific representation 508B and the thermal map 524, are closer relative to the positions of hot-spot 514 from temperature sensor 516 illustrated in the application-specific representation 508A and thermal map 522. Accordingly, inaccuracies in the temperature measurement occur because the positions of the hot-spots and the temperature sensors do not coincide. The inaccuracies are exacerbated based on the application running on the core of the processor. The inaccuracies may be critical in some instances, for example, for implementations where there are junction temperature limitations that may not tolerate very high inaccuracies.

For example, when the hot-spot switches between floating point units and integer units when different applications are running on the device, there are multiple hot-spots at different location in region 504. Therefore if there is only one temperature sensor, the temperature sensor may not be able to capture accurate temperature readings of at least one of the different hot-spots created by running one or more applications on the processor.

Due to space and design constraints, the number of sensors used is limited, and hence there is a desire for a solution that can correct the offset depending on power consumed by the use case, in temporal and spatial fashion. To mitigate these defects, aspects of the present disclosure provide a thermal model for temporal temperature sensor position offset error correction.

FIGS. 6A-6D are an illustration 600 of exemplary thermal model for temporal temperature sensor position offset error correction, according to aspects of the present disclosure. The thermal model may be a pre-silicon thermal model that introduces reference thermal model parameters of an electronic device (e.g., SoC) under analysis. The reference thermal model parameters may correspond to estimated power at different regions of the SoC. The estimated power may be associated with a temperature difference value or an absolute temperature value. In some aspects, the estimated power and corresponding temperature difference value and/ or absolute temperature value may be defined based on numerical formulation and/or analytical formulation. For example, the thermal model may be based on transient thermal measurements that allow the thermal behavior of the electronic device (including, for example, heat spreading), to be characterized as a distributed RC (resistor-capacitor) network.

The reference thermal model parameters including the estimated power and corresponding temperature difference value and/or absolute temperature value may be stored in the computing device. For example, the reference thermal model parameters may be used as a reference for matching current application activities in various regions of a SoC to the reference thermal model parameters in a temporal temperature sensor position offset error correction system or framework. For example, a current temperature difference value or absolute temperature of a region of a currently operating SoC may be estimated based on the matching. The current estimate of the temperature difference value or absolute temperature may be used to correct the error measurements of the temperature sensors.

Figure 6:
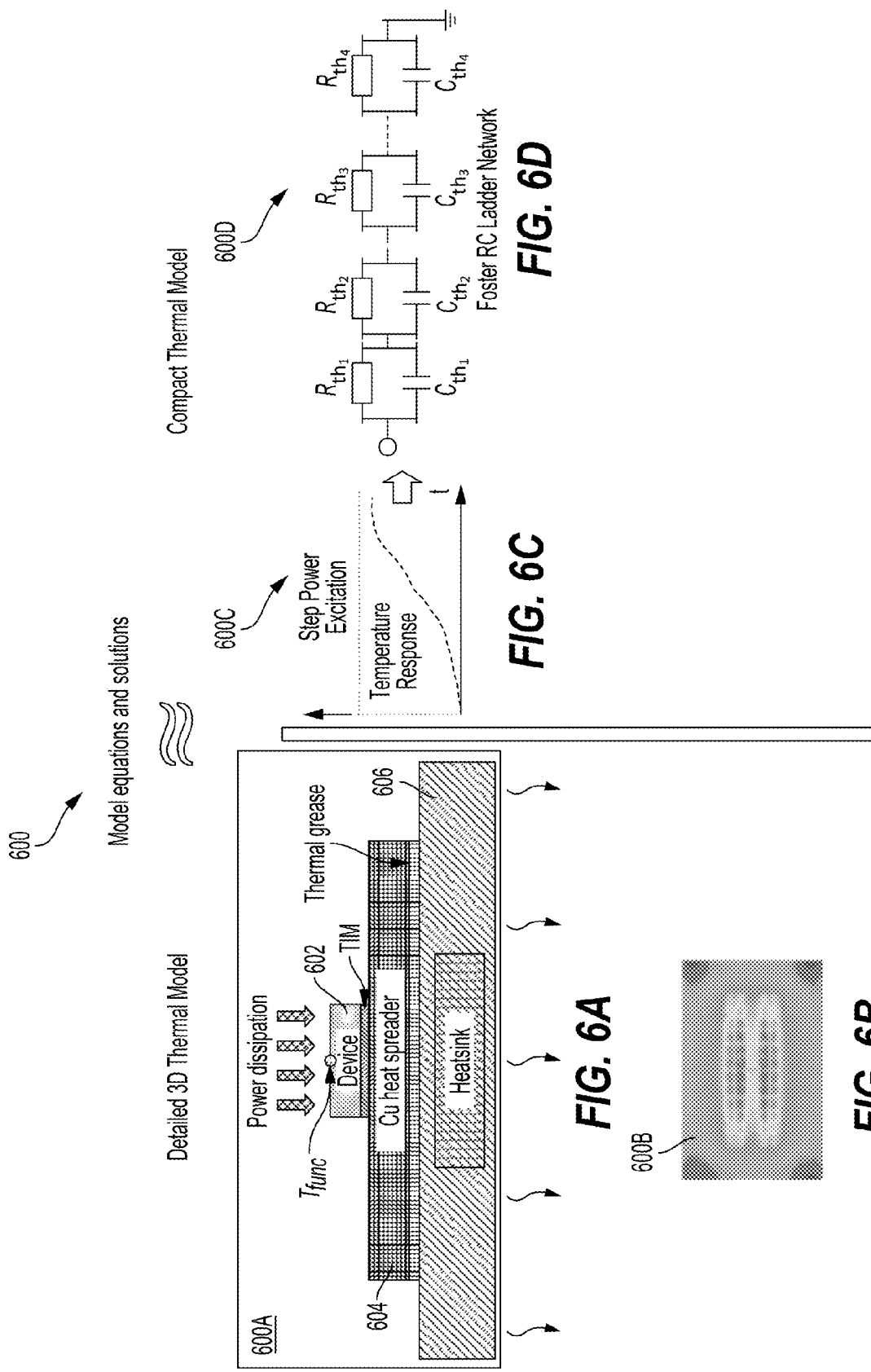
FIG. 6A is a diagram of an electronic device subject to application of power during operation according to aspects of the present disclosure.
FIG. 6B illustrates temperature distribution of the electronic device of FIG. 6A according to aspects of the present disclosure.
FIG. 6C illustrates a temperature versus time curve of an electronic device according to aspects of the present disclosure.
FIG. 6D illustrates an example of a distributed resistor-capacitor (RC) system according to aspects of the present disclosure.

FIG. 6A is a diagram of a three dimensional stack 600A including an electronic device 602 subject to application of power during operation, according to aspects of the present disclosure. The electronic device 602 may be a SoC device. The electronic device may be subject to heat akin to activities performed in different regions of the electronic device 602. Performing activities at the different regions of the SoC results in power consumption at the different regions of the SoC that correspond to the heat applied to the electronic device during pre-silicon thermal modeling.

The electronic device 602 under analysis may be subject to heat and may be coupled to heat conduction components. For example, power may be dissipated to the electronic device 602. A heat spreader 604 may be coupled to the electronic device 602 to spread heat from the electronic device 602. In addition, a heatsink 606 may be coupled to the heat spreader 604 to disperse the heat from the electronic device 602. The arrangement of the electronic device 602 under analysis may be in accordance with a three-dimensional configuration (e.g., three-dimensional stack). For example, the electronic device 602, the heat spreader 604 and the heatsink 606 may be stacked to form the three-dimensional stack.

Accordingly, FIG. 6A may illustrate an exemplary three dimensional thermal model according to aspects of the present disclosure where a temperature value (e.g., absolute temperature or temperature difference) is determined based on energy or power associated with the different regions of the electronic device 602. For example, a temperature value of the different regions of the electronic device may be calculated based on the following energy equation:

$$(\rho C)_s \frac{\partial T}{\partial t} = k_s \nabla^2 T \tag{1}$$

where δ represents a differential operator;
C represents thermal capacity in Joules per kilogram Kelvin (J/kgK);
(ρC) represents a product of solid density (m³/kg) and thermal capacity (J/kgK);
δT/δt represents a first order derivative of temperature with respect to time;
$k_s$ represents thermal conductivity of a solid material;
∇ is a delta operator that represents a first or higher-order differential depending on a selected exponent; and
T represents temperature.

In some implementations, the equation may be subject to boundary conditions. For example, boundary conditions represented by $h_fT_o$ can be input to equation (1), where $h_f$ is the convective heat transfer coefficient (watts per square meter Kelvin: W/(m²K)) at the boundary of a heated or cooled surface) and $T_o$ is a reference temperature (degrees centigrade)).

FIG. 6B illustrates a temperature distribution map 600B of the electronic device 602 of FIG. 6A, according to aspects of the present disclosure. For example, temperature distribution map 600B of the electronic device 602 is similar to temperature distribution map 600B of the SoC 502 of FIG. 5. The temperature distribution map 600B may be created based on a pre-silicon thermal model. Parameters used for defining temperature distribution map 600B may be obtained based on formulations such as analytical or numerical formulations.

For example, temperature distribution map 600B and corresponding reference thermal model parameters of the electronic device (e.g., SoC) under analysis may be obtained or estimated based on the energy equation (1). Temperature distribution map 600B and corresponding reference thermal model parameters may be stored in the computing device and used for temporal temperature sensor position offset error correction as described.

In some aspects of the disclosure, however, the three-dimensional stack may be converted into a compact thermal model for the temporal temperature sensor position offset error correction. The compact thermal model may be illustrated by FIGS. 6C and 6D.

FIG. 6C illustrates a temperature versus time curve 600C of the electronic device when the electronic device is subject to heat, according to aspects of the present disclosure. Power is applied to the electronic device and a change in temperature of the electronic device is measured with time. The x-axis of the graph represents time while the y-axis represents temperature. For example, to evaluate an RC system, a transient response is measured under a step power excitation.

For example, the thermal response of the system, subjected to step function power pulse (e.g., power dissipation as shown in FIG. 6A may be a step function power) is recorded. A suitable extraction technique is then used to define an RC ladder model (e.g., a Foster RC ladder model) with an equivalent response. For example, the step function may be modeled numerically or otherwise.

FIG. 6D illustrates an example of a distributed resistor-capacitor (RC) system (e.g., RC ladder) 600D according to aspects of the present disclosure. For example, the electronic device or thermal system (e.g., the three-dimensional stack) may be modeled into distributed RC systems, which can be modeled by thermal resistance (Rth) and thermal capacitance (Cth), as shown in FIG. 6D and the following equation 2.

$$C_{th}\frac{dT(t)}{dt} + \frac{T(t)}{R_{th}} = P(t) \qquad (2)$$

where T(t) is a temperature response to an arbitrary power trace input P(t); and $$\frac{dT(t)}{t}$$

is a time derivative of the temperature response

Thermal properties Rth and Cth on the heat spreading path determine the step power response of the system. Power consumed by a region of a SoC can be estimated based on models such as the RC ladder model. The power estimation may be based on formulations (e.g., analytical formulation or numerical formulation). For example, to determine the step response using a ladder model (e.g., Foster RC ladder model) in accordance with an analytical formulation, a time dependent thermal impedance can be written as:

$$Z_{th}(t) = \sum_{i=1}^{n} R_{th_i}\left(1 - e^{-\frac{t}{R_{th_i}C_{th_i}}}\right) \qquad (3)$$

where $R_{th_i}$ and $C_{th_i}$ form an ith stage of the RC ladder; and n is the number of stages of the RC ladder.

To determine the step response using a ladder model (e.g., Foster RC ladder model) in accordance with a numerical formulation, a time-dependent thermal impedance can be written as:

$$T_n = \sum_{i=1}^{l} \frac{2\tau_i - \Delta t}{2\tau_i + \Delta t}T_{n-1} + \frac{R_{th,i}\Delta t}{2\tau_i + \Delta t}(P_n + P_{n-1}): \qquad (4)$$

$$\tau_i = R_{th,i}C_{th,i}$$

where $T_n$ and $P_n$ are discrete temperature output and power input at time n+Δt.

The energy/power and temperature relationship derived by the numerical or analytical formulation may be used to define the thermal model parameters including the estimated power and corresponding temperature difference value and/or absolute temperature value that are stored in the computing device. The estimated power and corresponding temperature difference value and/or absolute temperature value may be matched with energy or power measurements obtained by the digital power monitor for one or more regions of a SoC running different applications. Temporal temperature sensor position offset error correction may be achieved based on the matching.

Figure 7:
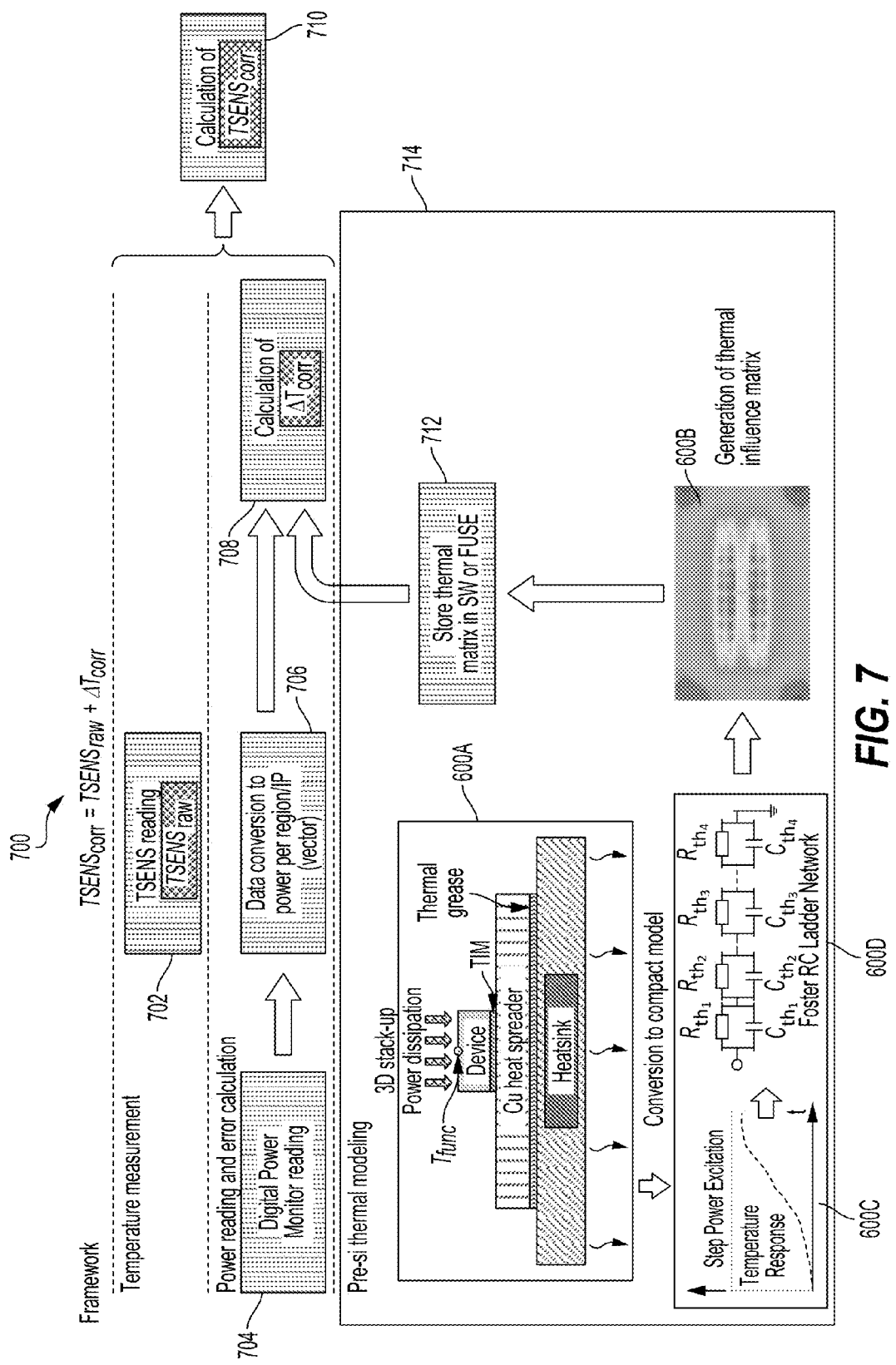
FIG. 7 is an illustration of a temporal temperature sensor position offset error correction system or framework according to aspects of the present disclosure.

FIG. 7 is an illustration of a temporal temperature sensor position offset error correction system or framework 700, according to aspects of the present disclosure. For illustrative purposes, some of the labelling and numbering of the devices and features of FIGS. 6A, 6B, 6C, and 6D are similar to those of FIG. 7. For example, the pre-silicon thermal modeling implementation 714 is similar to the pre-silicon thermal modeling implementation described with respect to FIGS. 6A, 6B, 6C, and 6D. Similar to the implementation of FIGS. 6A, 6B, 6C, and 6D, FIG. 7 illustrates that the temperature distribution map 600B and corresponding reference thermal model parameters may be stored in the computing device and used for temporal temperature sensor position offset error correction as described. In some aspects of the disclosure, the temperature distribution map 600B and corresponding reference thermal model parameters may be stored in the form of thermal matrix or field upgradeable systems environment (FUSE), as shown in block 712. For example, the FUSE is a re-configurable lightweight operating system created to support development on field programmable gate array (FPGA) systems.

In one aspect of the disclosure, a correction is added to a raw reading of the temperature sensor to provide a more accurate temperature reading of the SoC, as shown in equation 6.

$$TSENS_{corr} = TSENS_{raw} + \Delta T_{corr} \qquad (5)$$

where $\Delta T_{corr}$ is the correction;
$TSENS_{raw}$ is the raw reading of the temperature sensor, as shown in block 702; and
$TSENS_{corr}$ is the accurate temperature reading.

The correction $\Delta T_{corr}$ is based on the measurements (e.g., data) from the digital power monitor. For example, at block 704, a digital power monitor reading is acquired and provided to other devices (e.g., the processor, system or local) for further processing to determine the correction $\Delta T_{corr}$ and subsequently the accurate temperature reading. The power monitor may determine the power based on the activity of a core of the SoC. For example, certain regions of the core are more active depending on the application running on the core. The more active regions of the core tend to be the hottest regions of the core and are deemed the hot-spots of the core. Thus, the estimated temperature of the active regions corresponds to the temperature of the hot-spots of the core for a particular application. The temperature of the hot-spot may be estimated based on measuring power, which corresponds to activity of the active regions. The actual activity of the region provides more accurate reading of temperature of the region relative to a temperature measurement from a sensor that is away from the active region. For example, the reading of the digital power monitor may be converted to power per region, as shown in block 706, where IP represents a region where power is dissipated.

The stored information (in block 712) may be referenced, as shown in block 708, to interpret a digital power monitor reading or the converted digital power monitor reading (as shown in block 706) and to derive a correction temperature. The correction temperature is a difference between the reading of the temperature sensor and the interpretation of the digital power monitor reading. For example, the digital power monitor reading is matched to a temperature difference or absolute temperature reading stored in the computing device. At block 710, the accurate temperature reading is calculated.

Figure 8:
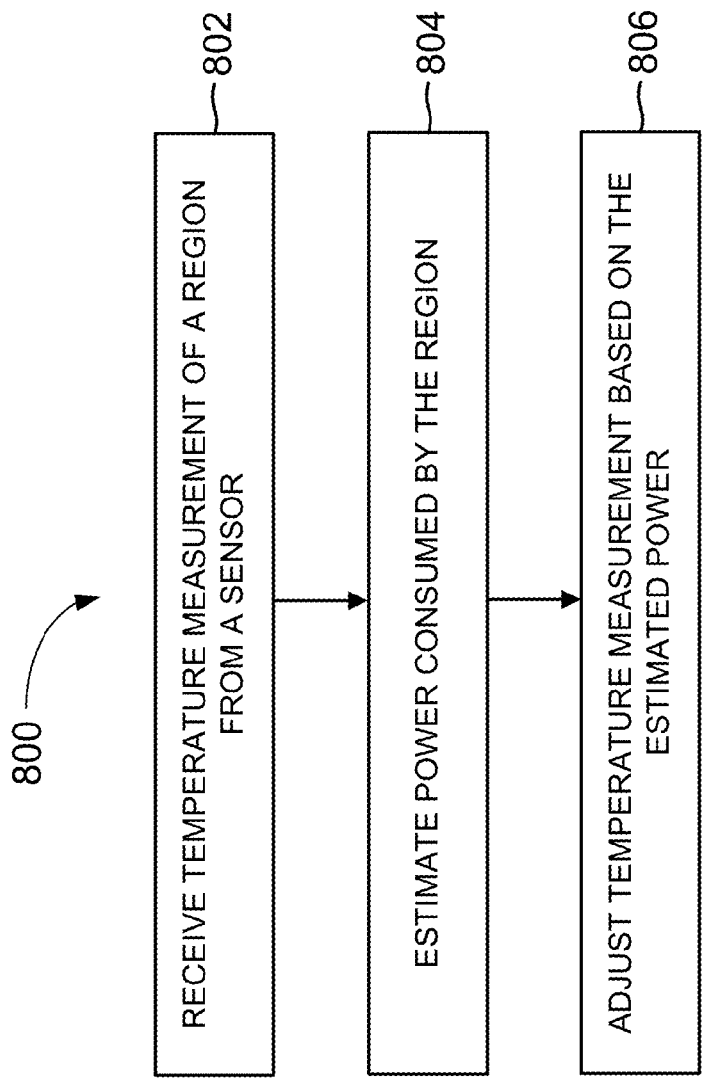
FIG. 8 is an illustration of a flow diagram of an example method of thermal mitigation.

FIG. 8 is a process flow diagram 800 illustrating a method of correcting thermal sensor measurements on a die, according to an aspect of the present disclosure. In block 802, a SoC device, including the die or a controller/processor of the computing device including the die, receives a temperature measurement of a region from a sensor. For example, the SoC device may include a controller/processor to perform the steps of the method. In block 804, the SoC device, including the die or a controller of the computing device including the die, estimates power consumed by the region. At block 806 the SoC device, including the die or a controller of the computing device including the die, adjusts the temperature measurement based on the estimated power.

According to a further aspect of the present disclosure, a temporal temperature sensor position offset error correction implementation is described. The temporal temperature sensor position offset error correction implementation includes means for receiving a temperature measurement of a region from a sensor. The receiving means includes a computing device 100, the computer processor within the computing device 100, the package 240, the power management integrated circuit 210, the SoC 230, the one or more cores 231-234, the ADC 331, the operational amplifier 332, the clock control unit 312, the thermal management unit 335, and/or the on-chip circuitry 300. The temporal temperature sensor position offset error correction implementation further includes means for estimating power consumed by the region. The power estimating means includes a power monitor (e.g., digital power monitor/meter), the computing device 100, computer processor within the computing device 100, the package 240, the power management integrated circuit 210, the SoC 230, one or more cores 231-234, the ADC 331, the operational amplifier 332, the clock control unit 312, the thermal management unit 335, and/or the on-chip circuitry 300. The temporal temperature sensor position offset error correction implementation further includes means for adjusting. The adjusting means includes the computing device 100, the computer processor within the computing device 100, the package 240, the power management integrated circuit 210, the SoC 230, one or more cores 231-234, the ADC 331, the operational amplifier 332, the clock control unit 312, the thermal management unit 335, and/or the on-chip circuitry 300. In another aspect, the aforementioned means may be any module or any apparatus configured to perform the functions recited by the aforementioned means.

Figure 9:
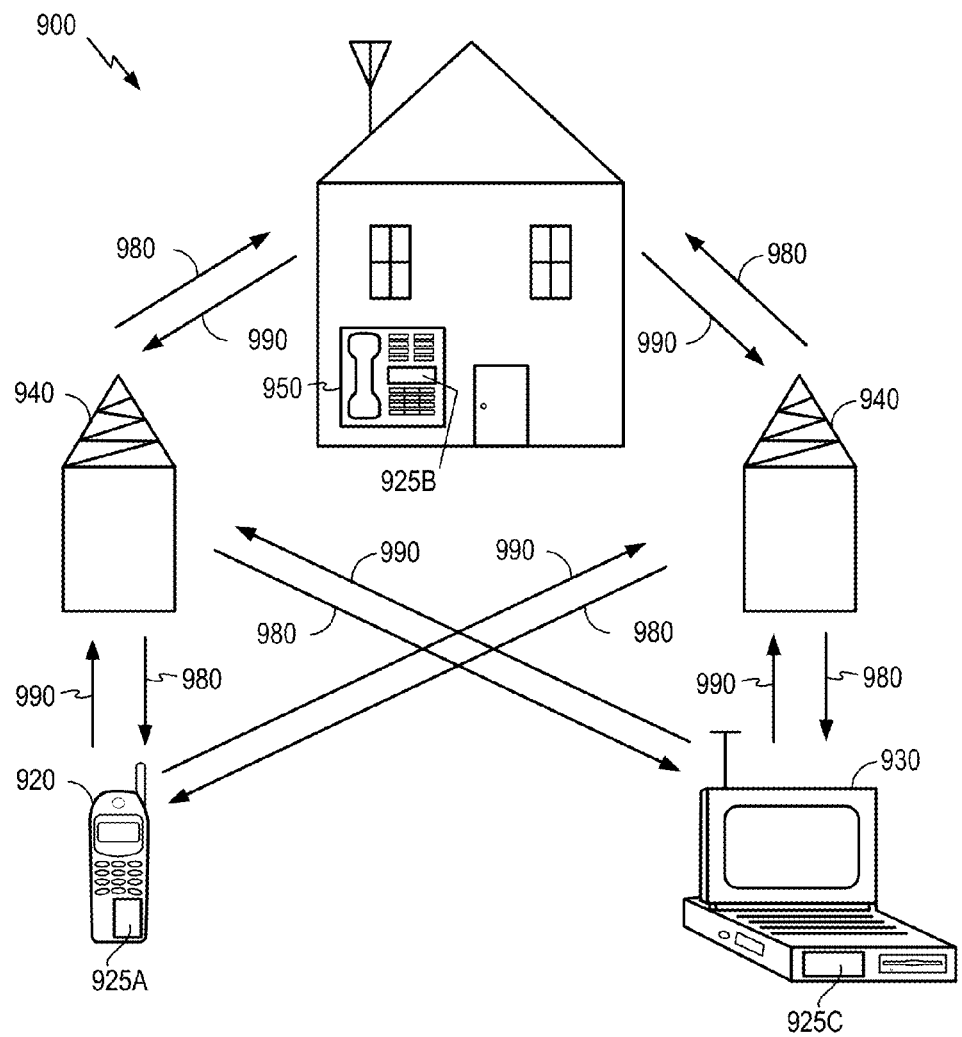
FIG. 9 is a block diagram showing an exemplary wireless communication system in which a configuration of the disclosure may be advantageously employed.

FIG. 9 is a block diagram showing an exemplary wireless communication system 900 in which an aspect of the disclosure may be advantageously employed. For purposes of illustration, FIG. 9 shows three remote units 920, 930, and 950 and two base stations 940. It will be recognized that wireless communication systems may have many more remote units and base stations. Remote units 920, 930, and 950 include IC devices 925A, 925B, and 925C that may include the disclosed SoC with temperature correction. It will be recognized that other devices may also include the disclosed SoC, such as the base stations, switching devices, and network equipment. FIG. 9 shows forward link signals 980 from the base station 940 to the remote units 920, 930, and 950, and reverse link signals 990 from the remote units 920, 930, and 950 to base stations 940.

In FIG. 9, remote unit 920 is shown as a mobile telephone, remote unit 930 is shown as a portable computer, and remote unit 950 is shown as a fixed location remote unit in a wireless local loop system. For example, a remote unit may be a mobile phone, a hand-held personal communication systems (PCS) unit, a portable data unit such as a personal data assistant, a GPS-enabled device, a navigation device, a set top box, a music player, a video player, an entertainment unit, a fixed location data unit such as meter-reading equipment, or other devices that store or retrieve data or computer instructions, or combinations thereof. Although FIG. 9 illustrates remote units according to the aspects of the disclosure, the disclosure is not limited to these exemplary illustrated units. Aspects of the disclosure may be suitably employed in many devices, which include the disclosed SoC with temperature correction.

For a firmware and/or software implementation, the methodologies may be implemented with modules (e.g., procedures, functions, and so on) that perform the functions described herein. A machine-readable medium tangibly embodying instructions may be used in implementing the methodologies described herein. For example, software codes may be stored in a memory and executed by a processor unit. Memory may be implemented within the processor unit or external to the processor unit. As used herein, the term "memory" refers to types of long term, short term, volatile, nonvolatile, or other memory and is not to be limited to a particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media include physical computer storage media. A storage medium may be an available medium that can be accessed by a computer. By way of example, and not limitation, such computer-readable media can include RAM, ROM, EEPROM, CD-ROM or other optical disk storage, magnetic disk storage or other magnetic storage devices, or other medium that can be used to store desired program code in the form of instructions or data structures and that can be accessed by a computer. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the technology of the disclosure as defined by the appended claims. For example, relational terms, such as "above" and "below" are used with respect to a substrate or electronic device. Of course, if the substrate or electronic device is inverted, above becomes below, and vice-versa. Additionally, if oriented sideways, above and below may refer to sides of a substrate or electronic device. Moreover, the scope of the present application is not intended to be limited to the particular configurations of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding configurations described herein, may be utilized according to the present disclosure. Accordingly, the appended claims are intended to include within their scope such processes, machines, manufacture, compositions of matter, means, methods, or steps.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The steps of a method or algorithm described in connection with the disclosure may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media, including any medium that facilitates transfer of a computer program from one place to another. A storage media may be any available media that can be accessed by a general-purpose or special-purpose computer. By way of example, and not limitation, such computer-readable media can include RAM, ROM, EEPROM, CD-ROM or other optical disk storage, magnetic disk storage or other magnetic storage devices, or any other medium that can be used to carry or store specified program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD) and Blu-ray disc where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "a step for."

What is claimed is:

1. A method of correcting thermal sensor measurements on a die, comprising:
   receiving a temperature measurement of a region from a sensor;
   measuring activity of the region, the measured activity including current flowing in a device including the die, or performance of the device including the die, which is based at least in part on a determination of a number of cache misses or a number of pipeline stalls;
   converting the measured activity into power of the region;
   deriving a temperature offset by referencing stored thermal model parameters to interpret the power or the activity of the region; and
   adjusting the temperature measurement based at least in part on the temperature offset.

2. The method of claim 1, in which the stored thermal model parameters include estimated power matched with a temperature difference.

3. The method of claim 1, in which the stored thermal model parameters include estimated power matched with an absolute temperature.

4. The method of claim 1, in which the measured activity comprises current flowing through a power switch.

5. The method of claim 1, in which the measured activity comprises performance of the device based at least in part on the die.

6. The method of claim 5, in which the performance measurements are determined based at least in part on performance counters.

7. The method of claim 1, in which measurement of the activity and conversion to power consumed by the region is performed by a digital power monitor/meter.

8. An apparatus for correcting thermal sensor measurements on a die, comprising:
   means for receiving a temperature measurement of a region from a sensor;
   means for measuring activity of the region, the measured activity including current flowing in a device including the die, or performance of the device including the die, which is based at least in part on a determination of a number of cache misses or a number of pipeline stalls;
   means for converting the measured activity into power of the region;
   means for deriving a temperature offset by referencing stored thermal model parameters to interpret the power or the activity of the region; and
   means for adjusting the temperature measurement based at least in part on the temperature offset.

9. The apparatus of claim 8, in which the stored thermal model parameters include estimated power matched with a temperature difference.

10. The apparatus of claim 8, in which the stored thermal model parameters include estimated power matched with an absolute temperature.

11. The apparatus of claim 8, in which the measured activity comprises current flowing through a power switch or performance of the device based at least in part on the die.

12. An apparatus for correcting thermal sensor measurements on a die, comprising:
   a memory; and
   at least one processor coupled to the memory, the at least one processor being configured:
      to receive a temperature measurement of a region from a sensor;
      to measure activity of the region, the measured activity including current flowing in a device including the die, or performance of the device including the die, which is based at least in part on a determination of a number of cache misses or a number of pipeline stalls;
      to convert the measured activity into power of the region;
      to derive a temperature offset by referencing stored thermal model parameters to interpret the power or the activity of the region; and
      to adjust the temperature measurement based at least in part on the temperature offset.

13. The apparatus of claim 12, in which the stored thermal model parameters include estimated power matched with a temperature difference.

14. The apparatus of claim 12, in which the stored thermal model parameters include estimated power matched with an absolute temperature.

15. The apparatus of claim 12, in which the measured activity comprises current flowing through a power switch.

16. The apparatus of claim 12, in which the measured activity comprises performance of a device based at least in part on the die.

17. The apparatus of claim 16, in which the performance measurements are determined based at least in part on performance counters.

18. A non-transitory computer-readable medium having non-transitory program code recorded thereon, the program code comprising:
   program code to receive a temperature measurement of a region from a sensor;
   program code to measure activity of the region, the measured activity including current flowing in a device including the die, or performance of the device including the die, which is based at least in part on a determination of a number of cache misses or a number of pipeline stalls;
   program code to convert the measured activity into power of the region;
   program code to derive a temperature offset by referencing stored thermal model parameters to interpret the power or the activity of the region; and
   program code to adjust the temperature measurement based at least in part on the temperature offset.

* * * * *